May 13, 1941.    J. G. ROBB ET AL    2,241,924
RADIO NAVIGATION AID
Filed Oct. 27, 1938

Inventors
JOHN GLOVER ROBB
JOHN MEGARRY FURNIVAL
& BERTRAM JOHN WITT
By
Attorney Patented May 13, 1941

2,241,924

UNITED STATES PATENT OFFICE 2,241,924

RADIO NAVIGATION AID

John Glover Robb, Richmond, John Megarry Furnival, Purley, and Bertram John Witt, Harrow, England, assignors to Radio Corporation of America, a corporation of Delaware Application October 27, 1938, Serial No. 237,214
In Great Britain November 18, 1937

4 Claims. (Cl. 250—11)

This invention relates to navigation-aiding radio transmitting installations and more particularly to such installations of the so-called equisignal beacon type, that is to say, of the type wherein a predetermined course line is defined by means of a transmitting installation which transmits two differently characterized overlapping directional radiations such that the predetermined course line is that upon which both radiations produce equal field strength. It is customary to characterize differently the two radiations by transmitting complementary signals thereon; for example, one signal may be the Morse letter E (a dot) and the other the Morse letter T (a dash) so that along the equisignal line or zone a receiver will receive a continuous dash, one or other signal predominating as the receiver departs in one or other direction from the predetermined course line. For the sake of convenience in description, it will be assumed in what follows that the signals are respectively a dot and a dash but it is to be understood that the present invention is not limited to the use of these particular differently characterizing signals.

Figure 1:
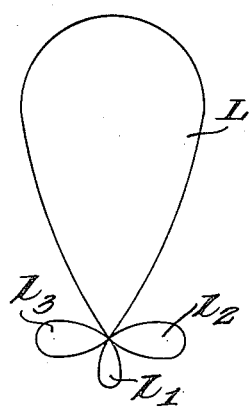
Figure 2:
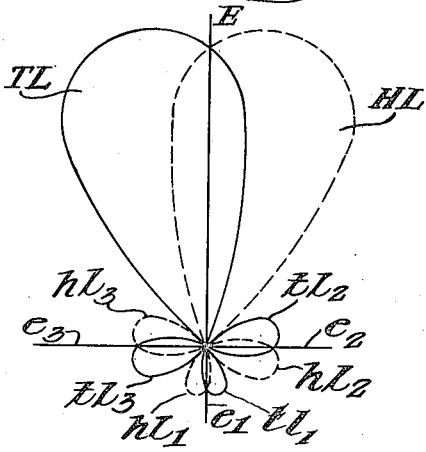
Figure 4:
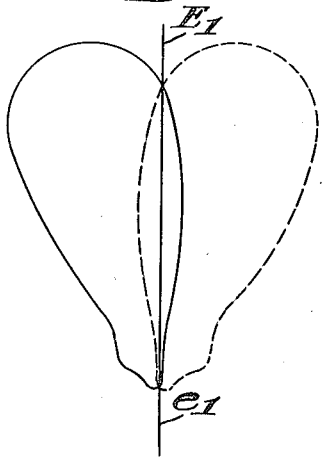
Figure 3:
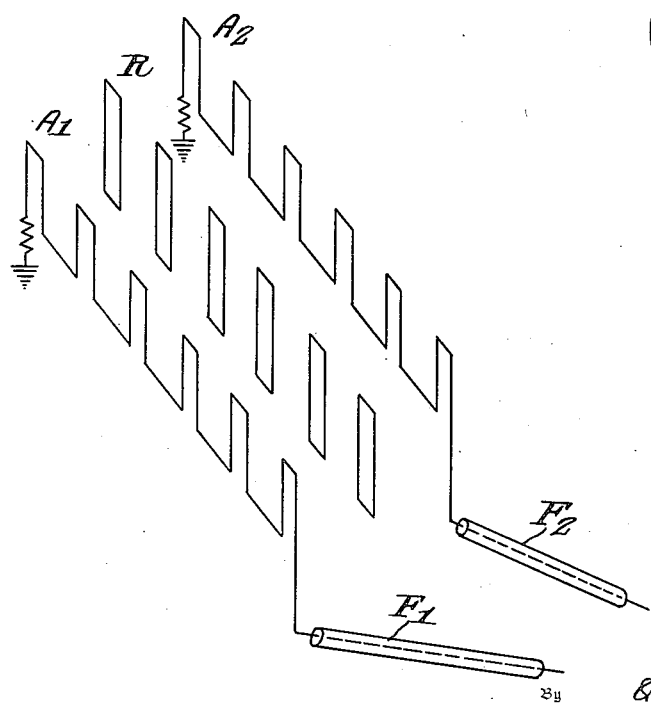

The invention is illustrated in and explained in connection with the accompanying drawing in which Figure 1 is a radiation diagram of a main lobe and subsidiary lobes; Figure 2 is a polar radiation diagram of a pair of overlapping fields; Figure 3 represents diagrammatically an embodiment of the invention; and Figure 4 is a polar diagram of the radiation obtained in accordance with the invention.

One of the difficulties commonly met with in most known beam equisignal beacon systems is that the polar diagrams representing the two directional transmissions are not in fact simple elongated lobes but exhibit subsidiary lobes extending in directions angularly related to the main desired transmitting directions. For example, in a known equisignal beacon system wherein two series phase aerial systems each comprising one or more parallel arrays are employed, one for the dot radiation and the other for the dash radiation, each aerial system produces a polar diagram of the general nature represented in Figure 1 and comprising one elongated lobe L in the desired direction of radiation and a plurality of, for example three, subsidiary lobes $l_1$, $l_2$, $l_3$, one ($l_1$) in a direction opposite to the desired direction and each of the other two ($l_2$, $l_3$) in opposite directions substantially at right angles to the direction of the lobe L.

Since the polar diagram due to the dot system is, as a whole, at a slight angle to the polar diagram due to the dash system, the result will not only be the production of an equisignal line due to the intersection of the main lobes of the two polar diagrams, but also the production of a number of other subsidiary, equisignal lines due to the intersection of corresponding subsidiary lobes, these subsidiary equisignal lines leading out in undesired directions and thus introducing a possibility of erroneous navigation. This is represented in Fig. 2 wherein the "dot" polar diagram is drawn in full lines with the lobes TL, $tl_1$, $tl_2$, $tl_3$ and the "dash" diagram is drawn in broken lines with the lobes HL, $hl_1$, $hl_2$, $hl_3$. The desired equisignal produced by intersection of the lobes TL and HL is the line E but in addition there are equisignal lines $e_1$, $e_2$, $e_3$ produced by the intersection of the lobes $tl_1$, $hl_1$; $tl_2$, $hl_2$; and $tl_3$, $hl_3$ respectively. E and $e_1$ are in the same straight line and may, for practical purposes, be regarded as one line.

The present invention seeks to provide improved navigation-aiding radio transmission of the equisignal type wherein this defect is avoided.

The object of the invention is achieved by providing means whereby subsidiary lobes occurring in the two polar diagrams obtained from the installation are segregated in such a manner that the lobes characterized by one of the two signals used are segregated to one side of the desired equisignal line while the lobes characterized by the other of the two signals used are segregated to the other side. In this way interaction between the remaining subsidiary lobes of the two polar diagrams is prevented and the production of undesired subsidiary equisignal lines is avoided.

One way of carrying out this invention as applied to an installation comprising two parallel series phase aerial systems for the dot and dash signals respectively is shown in Figure 3. Here the required segregation is obtained by providing a longitudinally disposed reflecting system centrally between the two series phase aerial systems, the reflecting system consisting, for example, of a plurality of reflecting elements.

More specifically, in the arrangement of Figure 3 there are employed two series phase aerials $A_1$, $A_2$, one ($A_1$) for the dot and the other ($A_2$) for the dash radiation, these aerials being arranged parallel to one another one on each side of the desired equisignal line. The aerials are fed by feeders $F_1$, $F_2$ from a transmitter (not shown). Between these two aerials is mounted a reflecting array or arrays generally designated R consisting of half wave length reflectors so suspended as to lie in a predetermined relationship with respect to the vertical parts of the series phase aerials. The provision of the intermediate reflector system R ensures that the "dot" subsidiary lobes can only occur to the "dot" side of the vertical plane in which the desired equisignal line lies, while the "dash" subsidiary lobes can occur only to the other side of this plane. Accordingly, there will be only one equisignal line produced. The resulting polar diagram is represented in Figure 4, the full line curve being for the "dash" radiation and the broken line curve for the "dot" radiation. The single resulting equisignal line is marked $E_1$, $e_1$. The reflecting system also serves to displace away from itself the lines of maximum radiation of the beams and thus assists in the production of two beams inclined at such an angle to one another as to result in an equisignal line of good "sharpness." Thus the screen system performs two important functions, namely, lobe segregation and the achievement of a desired angular displacement of the two beams.

The invention is, of course, not limited to the use of reflectors in conjunction with series phase aerials though a construction of this nature is very satisfactory for an ultra-short wave beacon of the equisignal type. Other constructions may, however, be employed so as to carry into effect the principle of the invention which consists in the segregation of subsidiary lobes so that unwanted equisignal lines cannot occur.

Series phase aerial systems are known per se and may be found described in the British specification No. 403,949 or U. S. Patent No. 2,053,658.

Having now particularly described and ascertained the nature of our said invention and in what manner the same is to be performed, we declare that what we claim is:

1. A navigation-aiding radio transmitting installation of the equisignal type wherein a predetermined course line is defined by means of an equipotential signal including in combination a pair of series phase antennas spaced on either side of said course line for establishing overlapping radio frequency fields in which the main overlapping portion includes the desired course line and subsidiary overlapping portions including undesired courses, and a plurality of reflectors located between said antennas and on said course line for limiting the position of the undesired overlapping portions so that their overlap forms an equipotential signal along said course.

2. A navigation-aiding radio transmitting installation of the equisignal type wherein a predetermined course line is defined by means of an equipotential signal including in combination a pair of series phase antennas aligned in parallel on either side of said course line for establishing overlapping radio frequency fields in which the main overlapping portion includes the desired course line and subsidiary overlapping portions including undesired courses departing from said desired course line, and a plurality of reflectors located between said antennas and on said course line for limiting the position of the undesired overlapping portions so that their overlap supplements the equipotential signal along said course.

3. A navigation-aiding radio transmitting installation of the equisignal type wherein a predetermined course line is defined by means of an equipotential signal including in combination a pair of series phase antennas spaced on either side of said course line and terminated at their far ends by an impedance for establishing directional overlapping radio frequency fields in which the main overlapping portion includes the desired course line and subsidiary overlapping portions including undesired courses, and a plurality of half wave reflectors located between said antennas and on said course line for limiting the position of the undesired overlapping portions so that their overlap forms an equipotential signal along said course.

4. A navigation-aiding radio transmitting installation of the equisignal type wherein a predetermined course line is defined by means of an equipotential signal including in combination a pair of series phase antennas spaced on either side of said course line and terminated at their far ends by an impedance for establishing directional overlapping radio frequency fields in which the main overlapping portion includes the desired course line and subsidiary overlapping portions including undesired courses, and a plurality of half wave reflectors located between said antennas and on said course line for limiting the position of the undesired overlapping portions so that their overlap forms an equipotential signal along said course and for directing the main portions of the respective fields to obtain the desired angular displacement.

JOHN GLOVER ROBB.
JOHN MEGARRY FURNIVAL.
BERTRAM JOHN WITT.